(12) United States Patent
Pelivanov et al.

(10) Patent No.: US 10,323,925 B2
(45) Date of Patent: Jun. 18, 2019

(54) COMPACT PORTABLE DOUBLE DIFFERENTIAL FIBER OPTIC SAGNAC INTERFEROMETER

(71) Applicant: University of Washington, Seattle, WA (US)

(72) Inventors: Ivan Pelivanov, Seattle, WA (US); Matthew O'Donnell, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

(21) Appl. No.: 15/332,998

(22) Filed: Oct. 24, 2016

(65) Prior Publication Data
US 2017/0115110 A1  Apr. 27, 2017

Related U.S. Application Data

(60) Provisional application No. 62/245,675, filed on Oct. 23, 2015.

(51) Int. Cl.
*G01B 9/02* (2006.01)
*G01C 19/72* (2006.01)
(Continued)

(52) U.S. Cl.
CPC ..... *G01B 9/02054* (2013.01); *G01B 9/02027* (2013.01); *G01B 9/02067* (2013.01);
(Continued)

(58) Field of Classification Search
CPC ...... G01C 19/64; G01C 19/72; G01C 19/721; G01C 19/722; G01B 9/02054
See application file for complete search history.

(56) References Cited

U.S. PATENT DOCUMENTS 4,379,409 A  4/1983 Primbsch et al.
4,530,603 A  7/1985 Shaw et al.
(Continued)

OTHER PUBLICATIONS

"Thorlabs Balanced Amplified Photodetectors PDB570C Operation Manual", Thorlabs.com https://www.thorlabs.com/newgrouppage9.cfm?objectgroup_id=3010, 2014, pp. 1-28.
(Continued)

*Primary Examiner* — Jonathan M Hansen
(74) *Attorney, Agent, or Firm* — Kilpatrick Townsend & Stockton LLP (57) ABSTRACT

A compact and portable apparatus for measuring properties of objects utilizing a fiber optic Sagnac interferometer is enabled. The fiber optic Sagnac interferometer may be a double differential Sagnac interferometer. The interferometer core may be implemented with fiber optic components including polarization maintaining optical fiber, and by utilizing an auto-balanced avalanche photodetector. An optical switch may be incorporated to maintain relatively low average probe signal power while allowing optimal peak probe signal power. The compact and portable apparatus may be configured to measure ultrasonic vibrations, a displacement of an object surface in response to ultrasonic vibrations, and/or a vibration speed of the object surface. A wideband light source may be amplified and stabilized. A sensor head of the interferometer may incorporate a collimator adjustable to block a central portion of the projected probe beam thereby at least in part enabling in-plane and out-of-plane measurements.

16 Claims, 5 Drawing Sheets

(51) Int. Cl.
*G02B 6/293* (2006.01)
*G02B 6/024* (2006.01)

(52) U.S. Cl.
CPC ......... *G01B 9/02097* (2013.01); *G02B 6/024* (2013.01); *G02B 6/29347* (2013.01)

(56) References Cited

U.S. PATENT DOCUMENTS

| | | | |
|---|---|---|---|
| 5,080,491 A | 1/1992 | Heon et al. | |
| 5,099,693 A | 3/1992 | Payne et al. | |
| 5,894,531 A * | 4/1999 | Alcoz | G01H 9/004 250/227.27 |
| 5,903,349 A * | 5/1999 | Vohra | G01P 15/093 250/227.19 |
| 7,180,598 B2 * | 2/2007 | Willig | G01C 19/721 356/460 |
| 7,474,411 B2 | 1/2009 | Dubois et al. | |
| 7,612,894 B2 | 11/2009 | Drake et al. | |
| 8,842,290 B2 | 9/2014 | Montgomery et al. | |
| 9,164,066 B1 | 10/2015 | Bossi et al. | |
| 9,383,342 B1 | 7/2016 | Motzer et al. | |
| 9,625,423 B2 | 4/2017 | Bossi et al. | |
| 2005/0120803 A1 | 6/2005 | Sokol et al. | |
| 2007/0081166 A1 * | 4/2007 | Brown | A61B 3/1005 356/479 |
| 2009/0010285 A1 | 1/2009 | Dubois et al. | |
| 2009/0156932 A1 | 6/2009 | Zharov et al. | |
| 2009/0238513 A1 * | 9/2009 | Hao | H04J 14/02 385/12 |
| 2010/0079766 A1 * | 4/2010 | Justin | G01C 19/728 356/465 |
| 2010/0213376 A1 * | 8/2010 | Gardner, Jr. | G01J 3/02 250/339.07 |
| 2013/0333472 A1 | 12/2013 | Georgeson et al. | |
| 2014/0071455 A1 * | 3/2014 | Dimashkie | G01C 19/721 356/460 |
| 2014/0116146 A1 | 5/2014 | Bossi et al. | |

OTHER PUBLICATIONS

Anastasi et al., "Pulse Compression Techniques for Laser Generated Ultrasound", Proceedings of the 1999 IEEE Ultrasonics Symposium, Oct. 1999, pp. 813-817.

Cerniglia et al., "Inspection of Additive-Manufactured Layered Components", Ultrasonics, vol. 62, Sep. 2015, pp. 292-298.

Culshaw et al., "The Optical Fibre Sagnac Interferometer: An Overview of Its Principles and Applications", Measurement Science and Technology, vol. 17 No. 1, Nov. 2005, R1-R16.

Dewhurst et al., "Optical Remote Measurement of Ultrasound", Measurement Science and Technology, vol. 10, No. 11, 1999, pp. R139-R168.

Dubois et al., "Progress on the Development of an Advanced Laser Ultrasound Generation Source for Inspecting Polymer-Matrix Composites", AIP Conference Proceedings, vol. 615, No. 1, May 2002, pp. 300-307.

Jain et al., "Laser Ultrasonics: The Next Big Nondestructive Inspection Technology?", Quality Magazine http://www.qualitymag.com/articles/90017, Aug. 3, 2011, pp. 1-6.

Jang et al., "Noncontact Detection of Ultrasonic Waves Using Fiber Optic Sagnac Interferometer", IEEE Transactions on Ultrasonics, Ferroelectrics, and Frequency Control vol. 49 Issue 6, Aug. 2002, pp. 767-775.

Mckie et al., "Rapid Inspection of Composites using Laser-Based Ultrasound", Review of Progress in Quantitative Non-destructive Evaluation. vol. 12, May 1993, pp. 507-516.

Pelivanov et al., "A 1 kHz A-Scan Rate Pump-Probe Laser-Ultrasound System for Robust Inspection of Composites", IEEE Transactions on Ultrasonics, Ferroelectrics, and Frequency Control, vol. 62, Issue 9, Sep. 2015, pp. 1696-1703.

Pelivanov et al., "A new fiber-optic non-contact compact laser-ultrasound scanner for fast non-destructive testing and evaluation of aircraft composites", Journal of Applied Physics vol. 115, Mar. 2014, pp. 113105-1-11305-11.

Pelivanov et al., "NDT of fiber-reinforced composites with a new fiber-optic pump-probe laser-ultrasound system", Photoacoustics vol. 2, Issue 2, Feb. 2014, pp. 63-74.

Wang et al., "A Remove, Non-destructive Laser Ultrasonic Material Evaluation System with Simplified Optical Fibre Interferometer Detection", Journal of Non-destructive Evaluation, vol. 28, Issue 2, Jun. 2009, pp. 75-83.

Yawn et al., "Large-Scale Laser Ultrasonic Facility for Aerospace Applications", Review of Progress in Quantitative Nondestructive Evaluation, vol. 18, edited by Thompson and Chimenti, Kluwer Academic/Plenum Publishers, May 1999, pp. 387-393.

\* cited by examiner

COMPACT PORTABLE DOUBLE DIFFERENTIAL FIBER OPTIC SAGNAC INTERFEROMETER

CROSS-REFERENCES TO RELATED APPLICATIONS

The present application claims the benefit of U.S. Provisional Appln No. 62/245,675 filed Oct. 23, 2015; the full disclosure which is incorporated herein by reference in its entirety for all purposes.

STATEMENT AS TO RIGHTS TO INVENTIONS MADE UNDER FEDERALLY SPONSORED RESEARCH AND DEVELOPMENT

Not Applicable

BACKGROUND OF THE INVENTION

Knowledge of materials properties is central to a wide variety of human endeavors, from manufacturing to medicine. In the quest for ever better such knowledge, particularly for high performance applications, laser ultrasonics has become important. Ultrasonic vibrations of a material can reveal much about the material's properties, and can be detected with a variety of laser-based techniques. Laser-based interferometry, in particular, can measure such vibrations to high accuracy and precision. However, conventional interferometry-based instruments have shortcomings including with respect to efficiency, effectiveness, sensitivity, usability, practicality, and/or flexibility. For example, some conventional instruments are cumbersome and/or non-portable. Some conventional instruments have insufficient sensitivity, for example, due to various noise sources. Some conventional instruments have restrictions with respect to material types, surface shapes and textures, distance of instrument sensors from surfaces and/or angle of instrument sensors with respect to surfaces.

Embodiments of the invention are directed toward solving these and other problems individually and collectively.

BRIEF SUMMARY OF THE INVENTION

In accordance with at least one embodiment of the invention, a compact and portable apparatus for measuring properties of objects utilizing a fiber optic Sagnac interferometer is enabled. The fiber optic Sagnac interferometer may be a double differential Sagnac interferometer. Sensitivity of the apparatus may be enhanced by implementing the interferometer core with fiber optic components including polarization maintaining optical fiber, and by utilizing an autobalanced photodetector. An optical switch may be incorporated to maintain relatively low average probe signal power while allowing optimal (e.g., maximum) peak probe signal power. Average probe signal power can be set to avoid excessive heating of a target of interest, and peak probe signal power can be set to further optimize measurement sensitivity. In accordance with at least one embodiment of the invention, the compact and portable apparatus may be configured to measure ultrasonic vibrations, a displacement of an object surface in response to ultrasonic vibrations, and/or a vibration speed of the object surface.

In accordance with at least one embodiment of the invention, a wideband light source such as a superluminescent diode may be amplified and stabilized at least in part by driving an optical amplifier such as a fiber amplifier into a predetermined saturation region. For example, the saturation may reduce one or more noise components of the light source signal. Alternatively, or in addition, one or more noise components in the light source signal may be detected, and compensated for, utilizing a temperature feedback signal and/or a current feedback signal. In accordance with at least one embodiment of the invention, a sensor head of the interferometer may incorporate a collimator adjustable to block a central portion of the projected probe beam thereby at least in part enabling in-plane and out-of-plane measurements with respect to a plane of the surface.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures.

Note that the same numbers are used throughout the disclosure and figures to reference like components and features.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, a compact and portable apparatus for measuring properties of objects utilizing a fiber optic Sagnac interferometer is enabled. The fiber optic Sagnac interferometer may be a double differential Sagnac interferometer to enhance sensitivity. Sensitivity may be further enhanced by implementing the interferometer core with fiber optic components including polarization maintaining optical fiber, and by utilizing an auto-balanced photodetector. An optical switch may be incorporated to maintain relatively low average probe signal power while allowing optimal (e.g., maximum) peak probe signal power. Average probe signal power can be set to avoid excessive heating of a target of interest, and peak probe signal power can be set to further optimize measurement sensitivity. In accordance with at least one embodiment of the invention, the compact and portable apparatus may be configured to measure ultrasonic vibrations, a displacement of an object surface in response to ultrasonic vibrations, and/or a vibration speed of the object surface.

In accordance with at least one embodiment of the invention, a wideband light source such as a superluminescent diode may be amplified and stabilized at least in part by driving an optical amplifier such as a fiber amplifier into a predetermined saturation region. For example, the saturation may reduce one or more noise components of the light source signal. Alternatively, or in addition, one or more noise components in the light source signal may be detected, and compensated for, utilizing a temperature feedback signal and/or a current feedback signal. In accordance with at least one embodiment of the invention, a sensor head of the interferometer may incorporate a collimator adjustable to block a central portion of the projected probe beam thereby at least in part enabling in-plane and out-of-plane measurements with respect to a plane of the surface.

Laser-ultrasonics is an attractive and powerful tool for applications such as photoacoustic tomography, photoacoustic microscopy, and non-destructive testing and evaluation (NDT&E) of composite materials. Current systems for non-contact detection of ultrasound have relatively low sensitivity compared to alternatives such as contact piezotransducers. They can also be expensive, difficult to adjust, and strongly influenced by environmental noise. Moreover, laser-ultrasound (LU) systems can be configured to launch about 50-100 firings per second, much slower than the kHz level pulse repetition rate of conventional systems. In accordance with at least one embodiment of the invention, such systems can be enhanced utilizing inexpensive, high repetition rate nanosecond diode-pumped or fiber lasers, modern fiber telecommunication optics and an optimally designed balanced probe beam detector. In accordance with at least one embodiment of the invention, a modified fiber-optic balanced Sagnac interferometer can be utilized as part of an LU pump-probe system for NDT&E of composite and metal materials used in aircraft, airspace, automotive, sport, safety and other industries.

Figure 1:
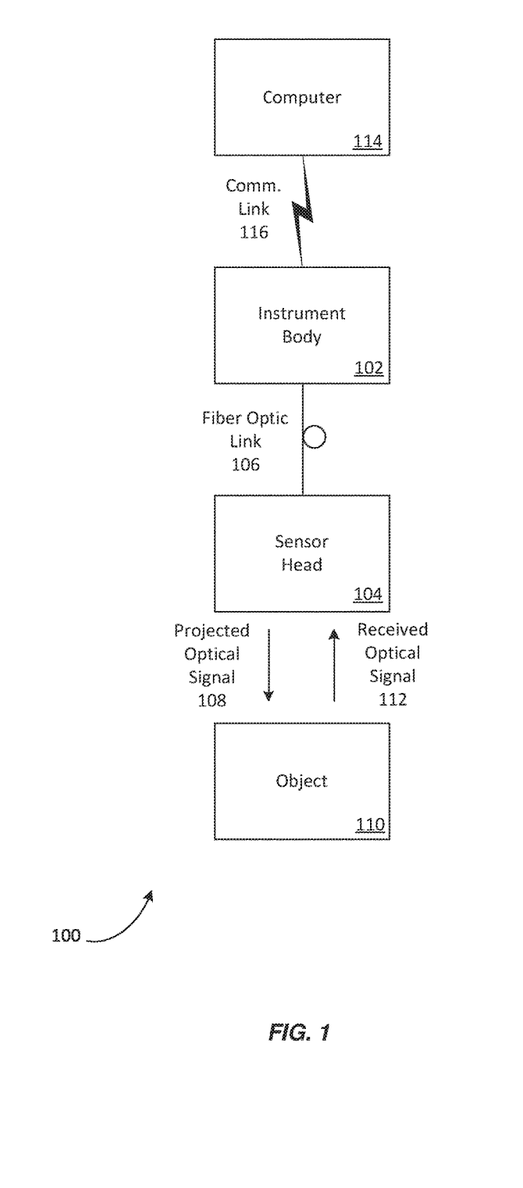
FIG. 1 is a schematic diagram depicting aspects of an example system architecture in accordance with at least one embodiment of the invention.

FIG. 1 depicts aspects of an example system architecture 100 in accordance with at least one embodiment of the invention. The example system architecture 100 includes an instrument body 102 linked to a sensor head 104 with a polarization-maintaining optical fiber 106. The sensor head 104 projects an optical probe signal 108 onto an object of interest 110, and receives a reflected optical signal 112 from a surface of the object 110. The instrument body 102 generates materials property data for the object 110 based at least in part on the received optical signal 112. Such data may be provided to a computer 114 over a communications link 116 for analysis. The computer 114 may configure any user configurable parameters of the instrument body 102 and/or the sensor head 104. An example instrument body 102 is described below in more detail with reference to FIG. 2. An example sensor head 104 is described below in more detail with reference to FIG. 3. The computer 114 may incorporate and/or be incorporated by any suitable computing device and/or computer system. The communications link 116 may utilize any suitable communications link capable of communicating digital data including communication links based at least in part on internetworking communication protocols.

Figure 2:
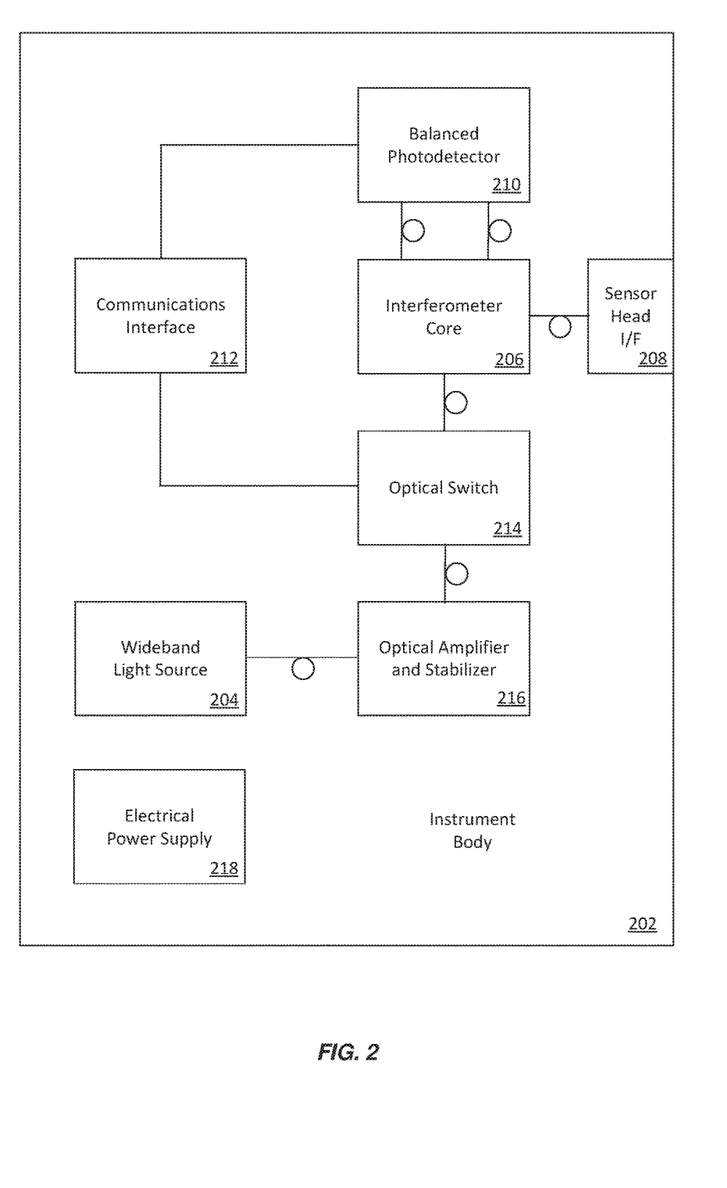
FIG. 2 is a schematic diagram depicting aspects of an example instrument body in accordance with at least one embodiment of the invention.

FIG. 2 depicts aspects of an example instrument body 202 in accordance with at least one embodiment of the invention. The instrument body 202 of FIG. 2 is an example of the instrument body 102 of FIG. 1. The instrument body 202 may include a wideband light source 204 such as a superluminescent diode providing a source signal to an interferometer core 206. An example interferometer core 206 is described below in more detail with reference to FIG. 4. The interferometer core 206 includes multiple fiber-optic components (not shown in FIG. 2), and may provide a split beam probe signal to the sensor head 104 (FIG. 1) via a sensor head interface 208. The sensor head interface 208 may include one or more optical fibers linking the instrument body 202 and the sensor head 104. The sensor head 104 may detect a part of the optical split beam probe signal reflected back by the sample surface, rotate the polarization of the split beams and return a corresponding data signal to the interferometer core 206. Being coupled back to the interferometer core, split beams may interfere and form the interference signal sensitive to ultrasound vibrations at the sample surface; the interference signal may be split again before being coupled into a balanced photodetector 210 to remove polarization insensitive light and further improve the signal-to-noise ratio of the detection. Output of the balanced photodetector 210 may be provided to a communications interface 212 for communication to, for example, the computer 114. The communications interface 212 may also receive commands and/or data capable of triggering and/or configuring an optical switch 214. The communications interface 212 may be an interface to an suitable communications link. For example, the communications interface 212 may provide access to a wired or wireless digital communications link including a communications link based on internet communication protocols. The balanced photodetector 210 may provide measurement data to the communications interface 212, for example, as digital data encoded in accordance with a serial communications standard. The communications interface 212 may provide signals to the optical switch 214 in a similar manner. An optical amplifier and stabilizer 216 may amplify and stabilize the signal output by the wideband light source 204. An electrical power supply 218 may provide electric power to those components that require it, e.g., the wideband light source 204, the communications interface 212, the balanced photodetector 210, the optical switch 214 and/or the optical amplifier and stabilizer 216. In the example depicted in FIG. 2, the connections depicted with "loops" are optical fiber couplings, whereas the connections depicted with plain lines are not necessarily optical, for example, they may be electronic communication links. This convention is used throughout the Figures.

Figure 3:
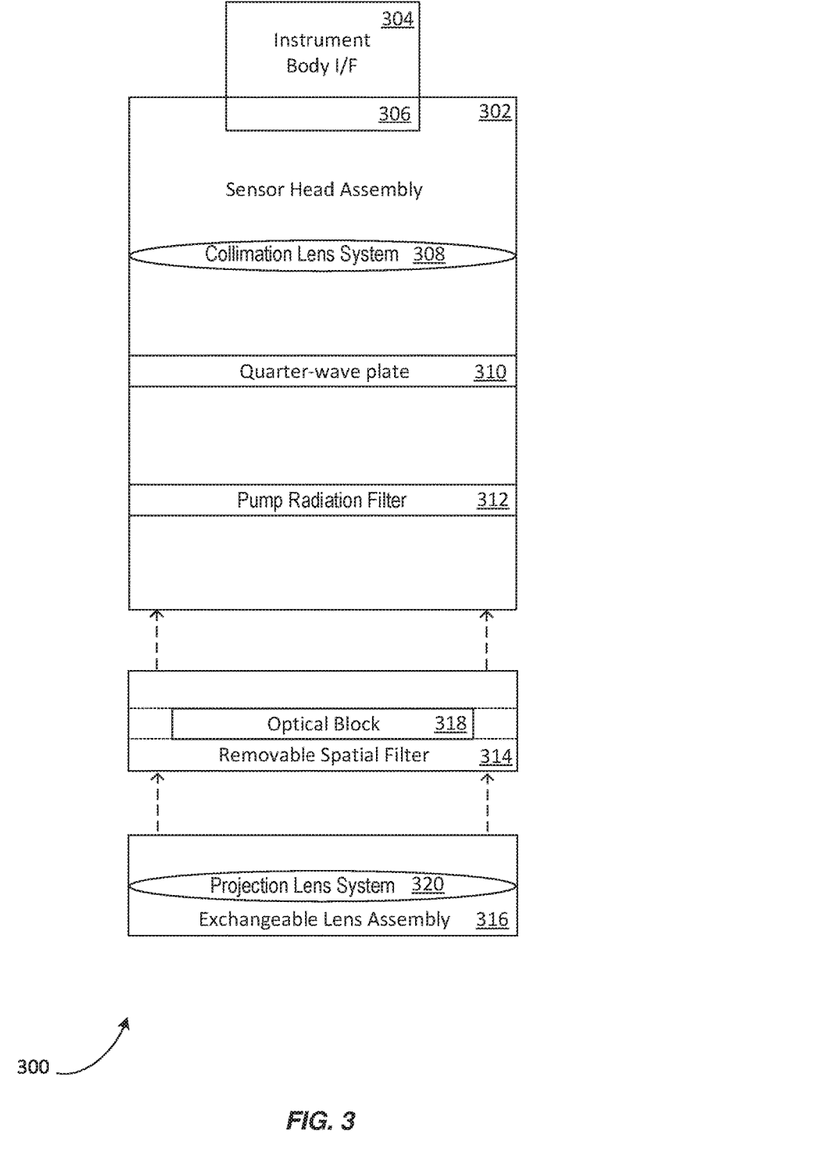
FIG. 3 is a schematic diagram depicting aspects of an example sensor head in accordance with at least one embodiment of the invention.

FIG. 3 depicts aspects of an example sensor head 300 in accordance with at least one embodiment of the invention.

The sensor head 300 of FIG. 3 is an example of the sensor head 104 of FIG. 1. The sensor head 300 may include a sensor head assembly 302 coupled with an instrument body interface 304. The instrument body interface 304 may include one or more optical fibers linking the sensor head 300 and the instrument body 102. A signal projection and receive surface 306 may project a split beam probe signal originated by the instrument body 102 through the sensor head assembly 302 towards the bottom of FIG. 3. The projected optical split beam probe signal may be focused by a collimation lens system 308 (e.g., one or more lenses including a convex lens). The polarization of two split bean components may be rotated with a quarter-wave plate 310. Pump radiation may be blocked with a pump radiation filter 312. A removable spatial filter 314 and/or an exchangeable lens assembly 316 may further modify the projected optical split beam probe signal when attached to the sensor head assembly 302 (as indicated by dashed arrows in FIG. 3). The removable spatial filter 314 may include an optical block 318 configured to block a central portion of the projected optical signal. After reflecting from a surface of the object of interest 110, the reflected optical signal may progress towards the top of FIG. 3 through the sensor head assembly 302 to be received by the signal projection and receive surface 306 and transmitted to the instrument body 102 via the instrument body interface 304. The optical block 318 of the removable spatial filter 314 may have an adjustable size. Alternatively, or in addition, the removable spatial filter 314 may be one of a set with different optical blocks. Similarly, the exchangeable lens assembly 316 may be one of a set having a projection lens system 320 with differing optical properties. Such lens(es) 320 may have any suitable optical properties.

Figure 4:
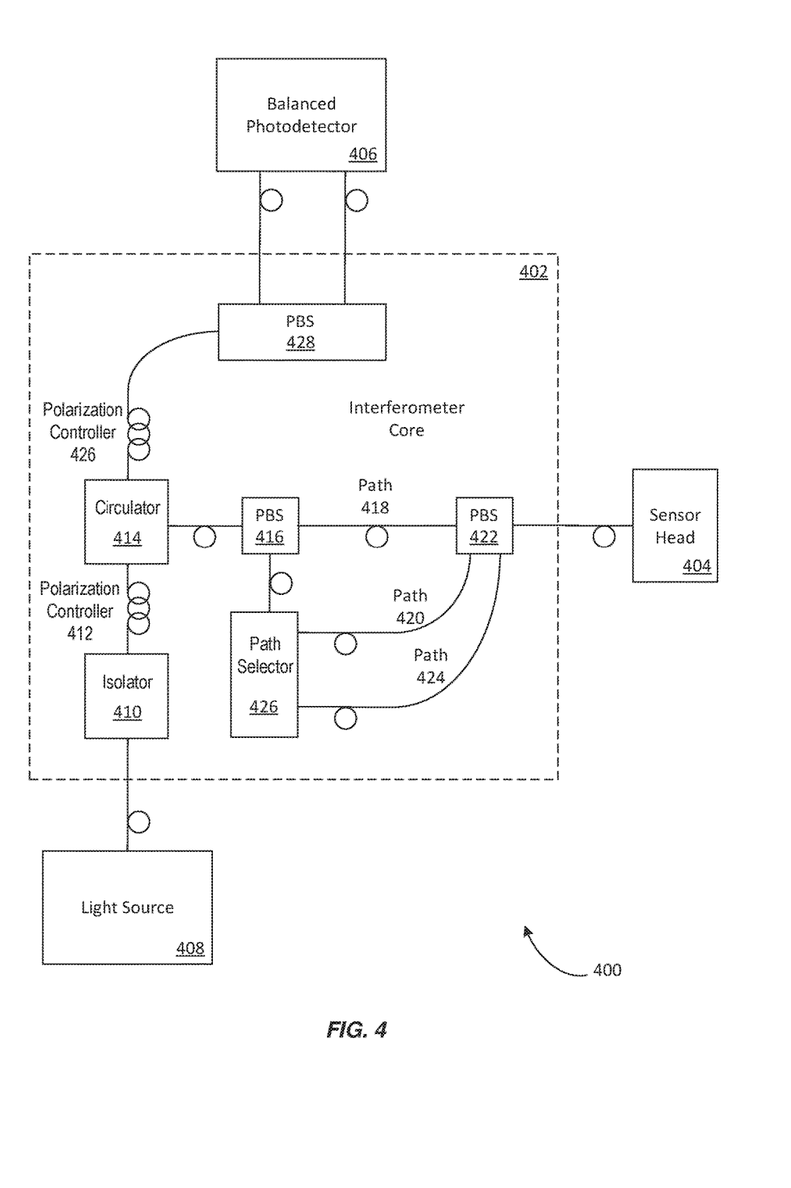
FIG. 4 is a schematic diagram depicting aspects of an example interferometer assembly in accordance with at least one embodiment of the invention.

FIG. 4 depicts aspects of an example interferometer assembly 400 in accordance with at least one embodiment of the invention. The interferometer assembly 400 may be used to implement a Sagnac interferometer, a fiber optic Sagnac interferometer and/or a double differential Sagnac interferometer. Interferometer core 402 of FIG. 4 is an example of the interferometer core 206 of FIG. 2. Sensor head 404 of FIG. 4 is an example of sensor head 104 of FIG. 1. Balanced photodetector 406 of FIG. 4 is an example of balanced photodetector 210 of FIG. 2. Light source 408 of FIG. 4 may be implemented with one or more optical components including wideband light source 204 of FIG. 2. The light source 408 may provide an optical probe signal to an optical isolator 410 of the interferometer core 402. In accordance with at least one embodiment of the invention, the light source 408 is the output of the optical switch 214, e.g., the wideband light source 204 as modified by the optical amplifier and stabilizer 216 and/or the optical switch 214. The optical isolator 410 may progress the optical probe signal through a polarization controller 412 to an optical circulator 414.

Output of an interferometer is directly related to the interference between two independent optical beams. To create these beams in a Sagnac approach (FIG. 4), light (e.g., laser radiation) initially linearly polarized along the slow axis is rotated by 45 degrees using the polarization controller 412 and then divided into two arms with a polarization beam splitter 416. These two arms (e.g., optical path 418 and optical path 420) have different lengths so that two optical waves appear at a next polarization beam splitter 422 with a fixed delay. The delay determines a maximum detectable ultrasound frequency and can be adjusted by changing the longer fiber (e.g., optical path 420) to a different length (e.g., to optical path 424). In accordance with at least one embodiment of the invention, such a change may be effected with an optical path selector 426. A collimator (e.g., of sensor head 404) focuses the probe radiation from polarization beam splitter 422 onto a sample surface (e.g., onto a surface of object 110 of FIG. 1). The sensor head 300 (FIG. 3) may contain several lenses, the collimation lens system 308 collimates outgoing radiation from the fiber and the other lens 320, with a high numerical aperture, focuses radiation onto the surface of the object 110. There are a few additional components between the lenses: the pump radiation filter 312 to propagate probe radiation without distortion and block any pump laser radiation at the same time; and a high aperture quarter wave (QW) plate 310 exchanging the polarization of the two interfering beams after reflection from the surface of the object 110.

Radiation coupled back to the fiber (e.g., via 306 of FIG. 3) contains two delayed waves, similar to incident illumination conditions but with exchanged polarizations. The wave that propagated initially through the short arm 418 now propagates through the long arm (e.g., path 420) on the way back, and vice versa for the second beam. These beams have no delay when they reach the polarization controller 426 where they interfere. After interfering, the beam is finally split into two components by polarization beam splitter 428 and input to the balanced photodetector 406.

The interferometer core 402 may be implemented with fiber optic components. A 1550 nm wavelength may be used in the interferometer to leverage standard components and new innovations at this wavelength developed for the telecommunications industry. A low coherence source 204 (FIG. 2), e.g., a super luminescent diode (SLD), a fiber laser or similar, may be used on receive (i.e., by the instrument body 102 of FIG. 1), which makes the design insensitive to in-fiber reflections. The interferometer body 102 is relatively easy to adjust, performed by rotating (e.g., manually) the polarization pads of polarization controllers 412 and 426. Because no reference arm is used, the design is resistant to environmental noise. The output of the balanced photodetector 406 can be made proportional to object 110 surface vibration speed rather than displacement, which means, for example, that the time derivative of the detector output is not required to produce an electronic signal proportional to the acoustic pressure. Such direct detection of the acoustic pressure/particle velocity can optimize (e.g., maximize) the dynamic range for detection of high frequency acoustic signals. Balanced detection can reduce polarization insensitive light related to changes in refractive index of a sample, for example, due to thermal lensing. The interferometer can have reduced sensitivity to surface roughness because both interfering beams are reflected from exactly the same area of the sample surface. The overall detection bandwidth of the system can be optimized simply by exchanging and/or selecting the optical fiber in the delay line (e.g., optical path 420 or 424).

Figure 5:
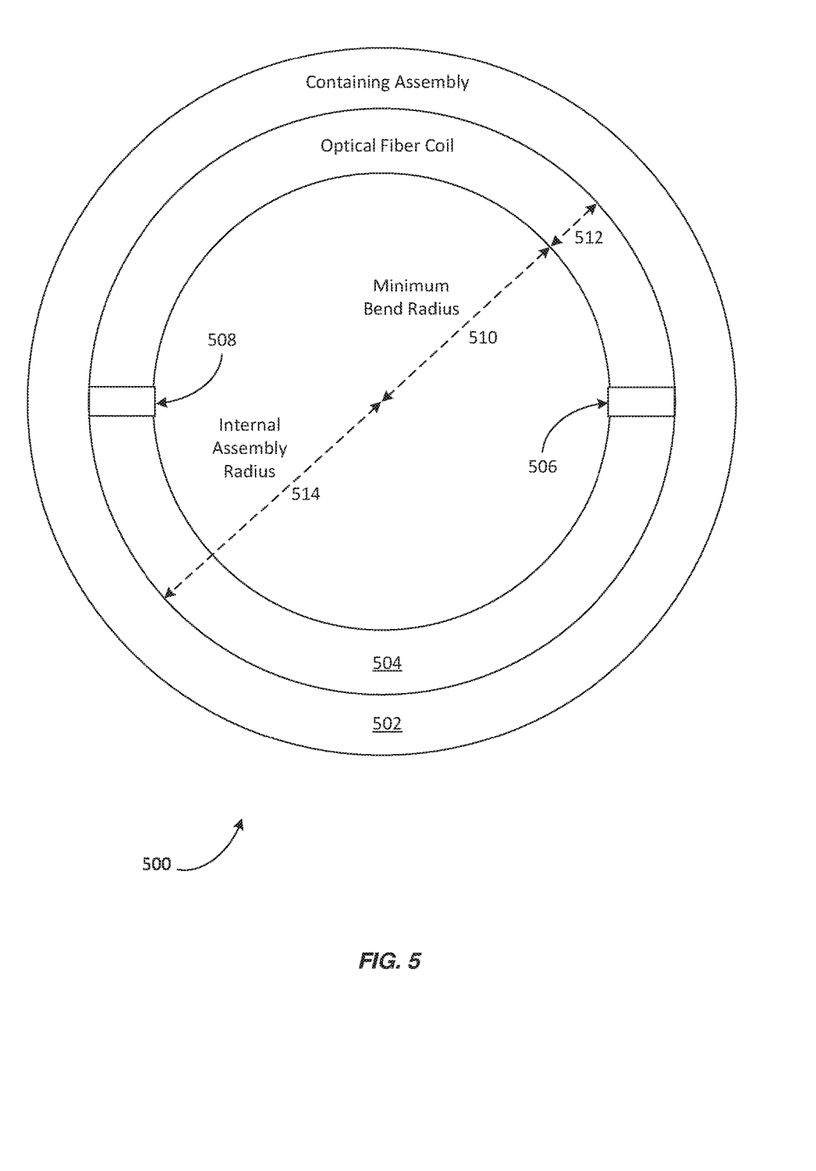
FIG. 5 is a schematic diagram depicting aspects of an example instrument body cross section in accordance with at least one embodiment of the invention.

FIG. 5 depicts aspects of an example instrument body cross section 500 in accordance with at least one embodiment of the invention. For example, the cross section 500 may be a cross section of the instrument body 102 of FIG. 1. A containing assembly 502 may contain the components of the instrument body including one or more optical fiber coils 504. For example, the optical fiber coil 504 may correspond to optical path 418 or optical path 420 of FIG. 4. In this example, the optical fiber coil 504 is attached with the containing assembly 502 with two fasteners 506 and 508. Optical fiber has a minimum bend radius, beyond which the optical fiber may be damaged. FIG. 5 depicts a minimum bend radius 510 of the optical fiber in the coil 504. The coil 504 also has some width 512, which may be as low as a single diameter of the optical fiber in the coil 504. An internal radius 514 of the containing assembly 502 may be as low as the minimum bend radius 510 added to the coil width 512. Although the containing assembly cross section 502 is depicted an annulus in this example, the containing assembly 502 may have any suitable shape. Nevertheless, containing assembly 502 may contain a cylindrical volume having a radius corresponding to the internal assembly radius 514.

In accordance with at least one embodiment of the invention, components of the instrument body 102 (FIG. 1) may be assembled inside a compact containing assembly 502. Such a compact containing assembly 502 is portable by a person. The instrument body 102 can be mounted on a custom holder, wall or substrate, for example, using 3-D fabrication techniques. The interferometer body 102 may be a component inside a portable system for non-contact detection of ultrasound vibrations from any suitable source. In accordance with at least one embodiment of the invention, power stabilizing the wideband optical source 204 can reduce noise related with optical power fluctuations and improve the overall sensitivity of the detection system.

An optical switch 214 (FIG. 2) may illuminate the sample (e.g., object 110) when ultrasound vibrations are being recorded and turn the light off during the dead time between recordings. This can reduce mean power used on receive (i.e., by the instrument body 102 and/or the sensor head 104) to a sub mW level, for example, enabling biomedical applications where there are limitations on optical power delivery or when delicate materials are investigated. A fiber amplifier (e.g., optical amplifier and stabilizer 216) may be added to reduce an influence of shot noise and approach the ultimate detection sensitivity of Nyquist acoustic (thermal) noise. The sensor head 300 (FIG. 3) may incorporate a removable spatial filter 314 enabling measurement of vibration speed in both in-plane and out-of-plane directions with variable operation standoff. An auto-balanced mode of detection may be employed to further minimize detector shot noise and make it possible to work with sample surfaces exhibiting extremely poor optical reflectivity.

The instrument body 102 may be assembled using a 3-D layout of fiber-optic components within a small "Coffee-Can" containing assembly 502 (FIG. 5), which can be put into a backpack, or even a pocket, and moved from one location to another by a person. The instrument body 102 may need to be adjusted with rotating polarization pads of polarization controllers 412 and 426 (FIG. 4) after movement.

An average power of the probe beam may be reduced using a fast optical switch 214 (FIG. 2). A shutter of the optical switch 214 opens when ultrasound vibrations are recorded. During the dead time between measurements, the shutter is closed. This can reduce the mean power used on receive to a sub mW level, and makes the detector ideal to probe materials with a delicate surface and for biomedical applications where certain limitations are imposed on optical power. The switch 214 can be used to turn the probe optical signal on/off to avoid sample overheating or at least to reduce overheating. For example, in some applications, acoustic signal may be recorded for about 10 us, e.g., synchronized with excitations by an excitation laser. When a 1 kHz pulse repetition frequency (PRF) is used, it allows the mean power to be reduced by 100 times. Therefore, peak power may potentially be amplified during the detection by 100 times, keeping the same mean power determining the sample heating.

Optical power may be stabilized with temperature/current feedback to reduce power fluctuations in the probe beam that are directly related with detection. This approach can help move the detection limit closer to the fundamental thermal (Johnson-Nyquist) noise floor determined by chaotic molecular motion.

A fiber amplifier 216 (FIG. 2) may be employed to amplify optical power to a certain limit determined by the maximum permitted exposure inherent to a material under study. This minimizes the influence of electronic shot noise on acoustic detection. In addition, an auto balanced mode of avalanche detection may be employed to further minimize detector shot noise and make it possible to work even with sample surfaces exhibiting extremely poor optical reflectivity.

To make measurements flexible for samples with different surface roughness, the collimator is equipped with high precision exchangeable lenses 316 (FIG. 3) that may be changed to optimize the operation standoff. To detect both in-plane and out-of-plane ultrasound vibrations, the collimator may block a central part of the beam with the removable spatial filter 314 to provide a fixed falling angle to the surface.

Backscattered optical radiation propagates in reverse thorough the interferometer so that interfering beams are switched in their paths with respect to forward propagation and are finally recorded by an photodetector operating in an auto-balanced mode. For example, the balanced photodetector 210 (FIG. 2) may be this type of balanced photodetector. This can further minimize detector shot noise and make it possible to work even with sample surfaces exhibiting extremely poor optical reflectivity.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

It should be understood that aspects of embodiments in accordance with the present invention can be implemented in the form of control logic using computer software in a modular or integrated manner. Alternatively, or in addition, embodiments of the invention may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. In particular, aspects of systems in accordance with embodiments of the invention may be partially or entirely implemented in hardware. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present invention using hardware and/or a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description. Various combinations of electrical, optical, and other hardware may be employed to implement embodiments of the invention. Such hardware includes electrical circuits, as well components that operate at least in part on the basis of instructions stored on non-transitory computer readable storage media.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

What is claimed is:

1. A compact and portable system for measuring a property of an object, comprising:
    a linearly polarized fiber optic Sagnac interferometer including a first length of optical fiber and a second length of optical fiber having a minimum bend radius, the second length of optical fiber arranged in a coil with an internal diameter substantially corresponding to twice a minimum bend radius of the second length of optical fiber;
    an auto-balanced photodetector optically coupled with the linearly polarized fiber optic Sagnac interferometer;
    a fiber polarization controller optically coupled with the linearly polarized fiber optic Sagnac interferometer and configured at least to control a linear polarization of an optic field at an input of the linearly polarized fiber optic Sagnac interferometer and an input of the auto-balanced photodetector; and
    an assembly configured to contain at least the fiber optic Sagnac interferometer, the fiber polarization controller and the auto-balanced photodetector, the assembly having a maximum internal dimension substantially corresponding to the internal diameter of the coil added to twice a maximum diameter of the second length of optical fiber.

2. A system in accordance with claim 1, wherein the assembly contains a substantially cylindrical volume and the maximum internal dimension corresponds to a diameter of the cylindrical volume.

3. A system in accordance with claim 1, wherein:
    the linearly polarized fiber optic Sagnac interferometer is further a double-differential linearly polarized fiber optic Sagnac interferometer; and
    the assembly and the double differential linearly polarized fiber optic Sagnac interferometer form an integrated structure that is portable by a person.

4. A system in accordance with claim 3, wherein each component of the double differential linearly polarized fiber optic Sagnac interferometer is implemented with fiber optics thereby at least in part further enabling the portability.

5. A system in accordance with claim 3, wherein the double differential linearly polarized fiber optic Sagnac interferometer comprises polarization-maintaining optical fiber at least in part thereby further enabling the portability.

6. A system in accordance with claim 3, wherein the assembly is further configured to contain an optical switch selectively coupling an optical signal from a wideband source into an input signal path of the double-differential linearly polarized fiber optic Sagnac interferometer.

7. A system in accordance with claim 3, wherein the assembly is further configured to contain an optical amplifier coupled with the double differential linearly polarized fiber optic Sagnac interferometer, the optical amplifier comprising a third length of optical fiber and being configured to amplify an optical signal from a light source substantially to a predetermined saturation point of the optical amplifier thereby stabilizing the optical signal.

8. A system in accordance with claim 3, further comprising a sensor head optically coupled with the double differential linearly polarized fiber optic Sagnac interferometer and configured to project a beam of light onto a surface of the object, the sensor head comprising a collimator adjustable to block a central portion of the beam thereby at least in part enabling in-plane and out-of-plane measurements with respect to a plane of the surface.

9. A system in accordance with claim 3, wherein the property of the object measured by the system comprises at least one of: a displacement of a surface of the object, and a vibration speed of the surface of the object.

10. A system in accordance with claim 3, wherein the property of the object measured by the system corresponds to an ultrasonic vibration of the object.

11. A system in accordance with claim 1, wherein the auto-balanced photodetector removes substantially all non-linearly polarized light.

12. A system in accordance with claim 3, further comprising:
a wideband light source optically coupled with the double differential linearly polarized fiber optic Sagnac interferometer and emitting an optical signal; and
an optical signal stabilizer optically coupled with the wideband light source and configured at least to reduce a noise component of the optical signal thereby contributing to an optimization of a sensitivity of the double differential linearly polarized fiber optic Sagnac interferometer.

13. A system in accordance with claim 12, wherein:
the optical signal stabilizer detects the noise component in the optical signal based at least in part on one or more of: a temperature feedback signal and a current feedback signal; and
amplifying the optical signal to a level that further contributes to the optimization of the sensitivity of the double differential linearly polarized fiber optic Sagnac interferometer comprises amplifying the optical signal substantially to a predetermined limit.

14. A system in accordance with claim 12, wherein:
the assembly is further configured to compactly contain at least the optical signal stabilizer, the optical signal amplifier, and an optical switch to form an integrated structure that is at least in part thereby portable by a person.

15. A system in accordance with claim 14, wherein interfering signals are formed by reflection of a beam from a same target surface area thereby at least in part optimizing the system's insensitivity to surface roughness.

16. A system in accordance with claim 1, wherein the fiber polarization controller controls orthogonal linear polarizations substantially everywhere inside the linearly polarized fiber optic Sagnac interferometer.

* * * * *